Dec. 2, 1924.

H. DE GEUS

PLANTER

Filed Oct. 26, 1921  2 Sheets-Sheet 1

1,517,715

INVENTOR
Henry De Geus
by
James C. Bradley
Atty

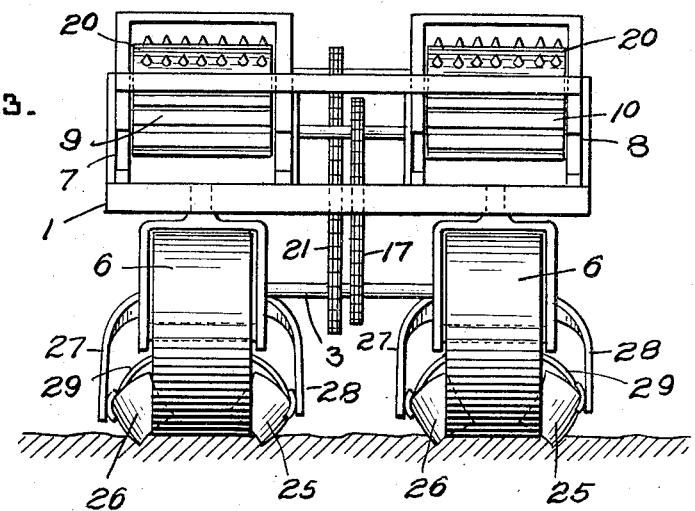
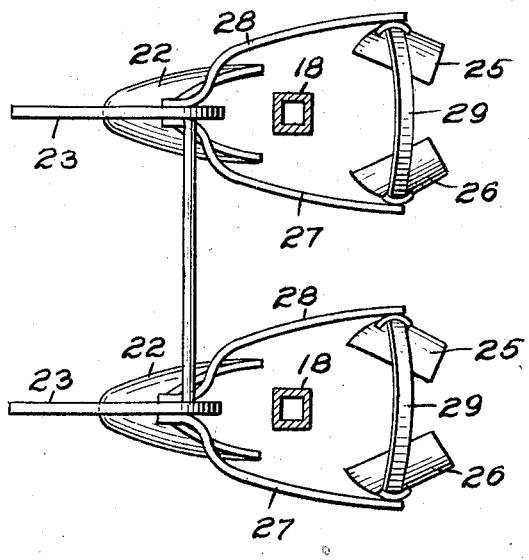

Patented Dec. 2, 1924.

1,517,715

UNITED STATES PATENT OFFICE.

HENRY DE GEUS, OF ALICIA, MICHIGAN, ASSIGNOR TO OWOSSO SUGAR COMPANY, A CORPORATION OF MICHIGAN.

PLANTER.

Application filed October 26, 1921. Serial No. 510,625.

*To all whom it may concern:*

Be it known that I, HENRY DE GEUS, a citizen of the United States, and a resident of Alicia, in the county of Saginaw and State of Michigan, have made a new and useful invention in Improvements in Planters, of which the following is a specification.

Figure 1:
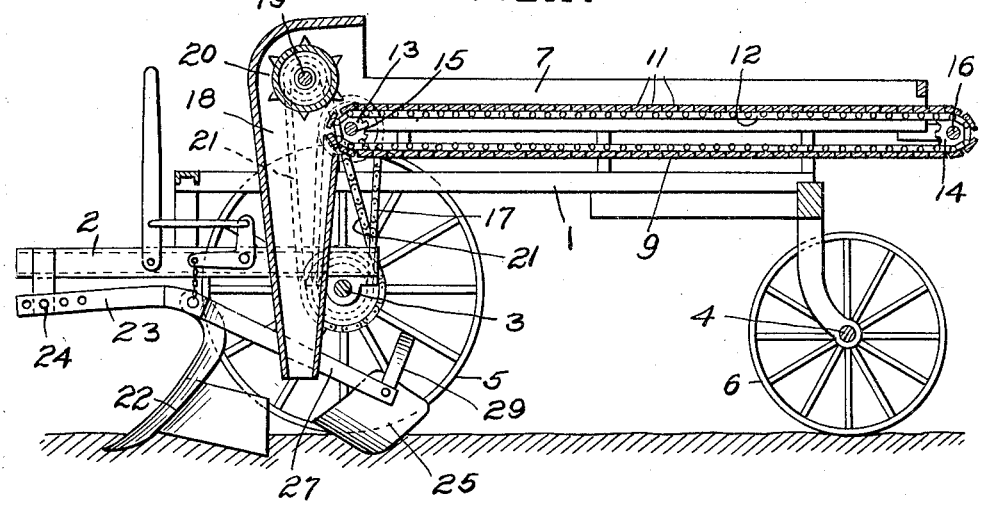
Figure 2:
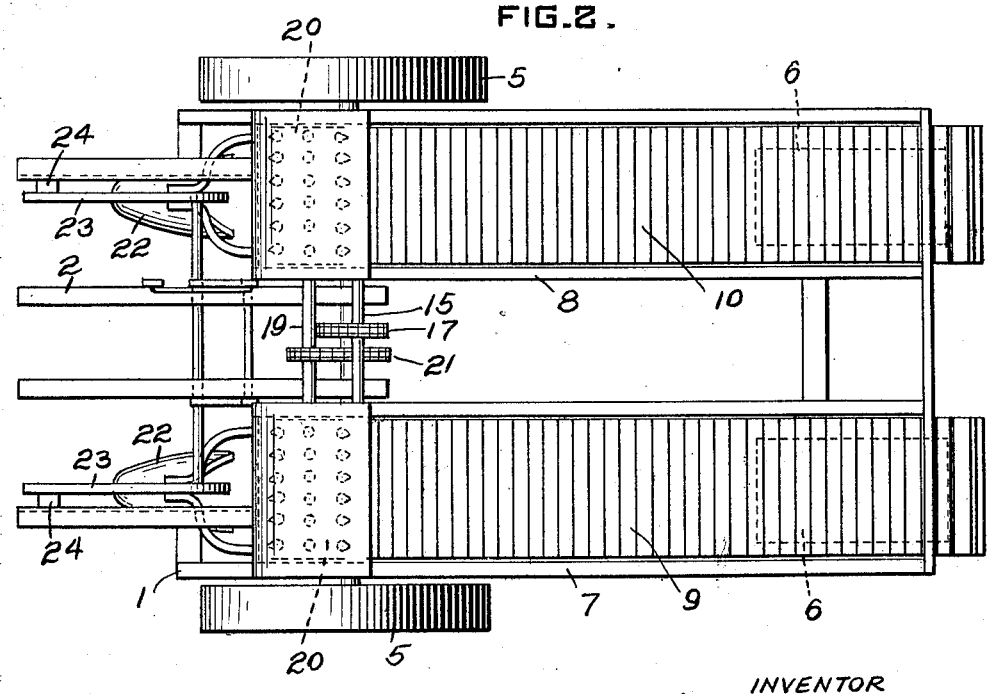

The invention relates to planters and particularly planters adapted to plant roots such as peppermint roots. The invention has for its principal objects the provision of an improved planter, which is automatic and at the same time reliable in operation, which is of simple, durable construction, which will feed the roots uniformly, and in which the proper covering of the roots by the soil and compacting thereof is insured. One embodiment of the invention is illustrated in the accompanying drawings, wherein:

Figure 1 is a vertical section through a truck embodying the invention. Fig. 2 is a plan view of the truck. Fig. 3 is a rear end elevation of the truck. And Fig. 4 is a plan view of the plow and mold board construction with the lower ends of the two hoppers indicated in section to show their location.

Referring to the drawings, 1 is the framework of the truck, to which is attached the forwardly projecting tongue 2, and which is provided with the axles 3 and 4, carrying the wheels 5—5 and 6—6. Mounted upon the truck is a pair of runways or troughs 7 and 8, extending longitudinally of the truck and provided with the pair of endless carriers 9 and 10 spaced apart as indicated in Fig. 2.

The carriers preferably consist of the transverse slats 11 carried at their ends by chains 12 (Fig. 1) extending around the sprockets 13 and 14. The sprockets 13 are mounted upon the shaft 15 while the sprockets 14 are mounted upon the shaft 16, suitable bearings for the shafts (not shown) being provided in the framework of the machine. The forward shaft 15 is driven by means of a sprocket chain 17 extending around the sprockets on the axle 3 and the shaft 15 as shown in Fig. 1.

Adjacent the forward end of each carrier is a hopper 18 adapted to receive roots supplied by the carrier and conduct them down to a point adjacent the ground. Extending transversely of the upper ends of the hoppers is a shaft 19 which carries the two spiked feed rollers 20. The shaft 19 and the rollers carried thereby are rotated from the sprocket chain 21 shown in Figs. 1 and 2, which extends around suitable sprockets on the axle 3 and shaft 19.

The spiked rollers serve to regulate the feed of the plants from the carrier 11. The roots are cut up in pieces about four inches long and placed upon the carriers, which move forwardly, bringing them to the position of engagement by the spikes of the rollers. The rollers limit the feed as the surfaces are placed relatively close to the surface of the slats 11 of the carriers, so that it is impossible for a large mass of roots to pass the rollers at one time. The rotation of the rollers causes the spikes to feed the roots into the hoppers and this feed is regular and uniform even though a considerable quantity of roots should collect adjacent the rollers. The slats 11 form a substantially plane continuous surface, so that the forward feeding effect is reduced and there is no undue tendency to force a mass of roots into a hopper at one time.

Forward of the lower end of each hopper is a plow 22 located in alignment with the end of the hoppers so that a furrow is prepared beneath each hopper. The plows are carried by the bars 23 pivoted to the tongue of the truck at 24. In order to automatically cover the roots after they have dropped into the furrows the mold boards 25 and 26 are employed, such mold boards being carried by the metal frameworks shown in Fig. 4 and comprising the members 27, 28 and 29. The rear wheels 6—6 of the truck are made relatively wide, as indicated in Figs. 2 and 3 and are positioned in alignment with the ends of the two hoppers so that the soil which is spread over the furrows by the mold boards 25 and 26 is compacted by the passage of these rear wheels of the truck.

In operation the truck is moved ahead either by horses or a tractor and the runways on the top of the truck are supplied with a quantity of the roots to be planted. The forward movement of the truck operates the endless carriers in the runways so that the roots are fed up against the rollers 20 and the operation of these rollers gives the desired feed of roots into the hoppers.

Furrows are produced by the plows 22 in advance of the lower ends of the hoppers into which the roots are supplied as the truck moves along, the soil being then spread over the furrows by the mold boards and finally compacted by the rear wheels of the truck.

What I claim is:

In combination in a root planter, a four-wheel truck, a pair of substantially horizontal feed ways spaced apart and extending longitudinally of the truck, a hopper at the forward end of each runway leading downward, an endless carrier at the bottom of each feed way adapted to discharge to the hopper, a spiked feed roller at the upper end of each hopper for regulating the feed from the carrier to the hopper, a plow in advance of the lower end of each hopper in alignment therewith, covering means to the rear of the lower end of each hopper, and means for operating the carrier and roller from the truck, the rear supporting wheels of the truck being located in alignment with the plows for compacting the soil in which the roots are deposited.

In testimony whereof, I have hereunto subscribed my name this 20th day of October, 1921.

HENRY DE GEUS.

Witnesses:
E. M. PETERSEN,
A. DE GEUS.